Aug. 6, 1940.                A. H. LAUDER                2,210,627
                        MOTOR CONTROL SYSTEM
                        Filed Feb. 12, 1938

Inventor:
Arthur H. Lauder,
by Harry E. Dunham
His Attorney.

Patented Aug. 6, 1940

2,210,627

UNITED STATES PATENT OFFICE 2,210,627

MOTOR CONTROL SYSTEM

Arthur H. Lauder, Schenectady, N. Y., assignor to General Electric Company, a corporation of New York Application February 12, 1938, Serial No. 190,260

8 Claims. (Cl. 172—289)

My invention relates to motor control systems and particularly to systems for controlling the application of excitation to a synchronous machine such as a synchronous motor, a synchronous generator, synchronous condenser, etc., so as to pull it into synchronism and for controlling the removal of excitation of a synchronous machine when it falls out of synchronism.

One object of my invention is to provide an improved arrangement of apparatus whereby the excitation may be applied at the proper time to cause the machine to develop its maximum pull-in torque.

Another object of my invention is to provide an improved arrangement for effecting the removal of the direct current field excitation as soon as the synchronous machine falls out of synchronism.

My invention will be better understood from the following description when taken in connection with the accompanying drawing and its scope will be pointed out in the appended claims.

Figure 1:
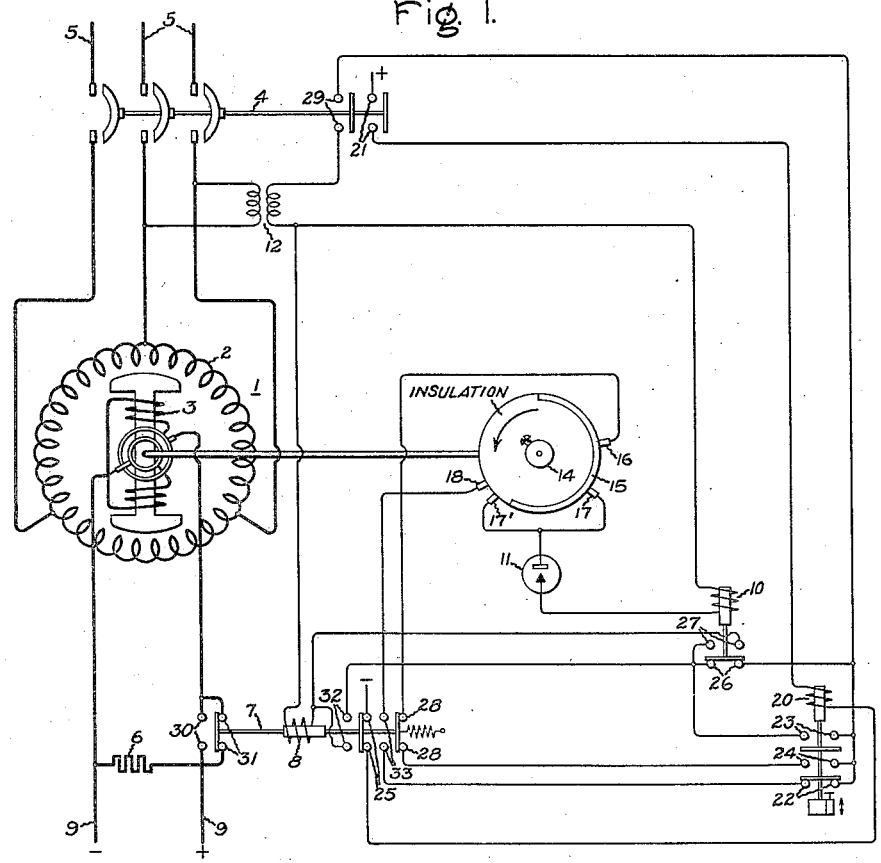
Figure 2:
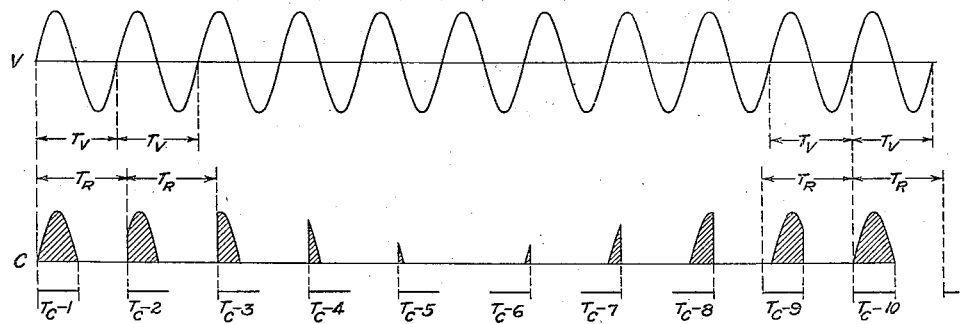

In the accompanying drawing, Fig. 1 diagrammatically illustrates a synchronous motor control system embodying my invention; and Fig. 2 consists of several curves which are used in explaining the operation of my invention.

Referring to Fig. 1 of the drawing, 1 represents a synchronous motor which is provided with a polyphase armature winding 2 and a field winding 3. In order to simplify the disclosure, I have shown my invention in connection with a full voltage starting arrangement for a synchronous motor so that the motor is started by connecting the armature winding 2, by means of a suitable manually controlled switch 4, directly across a polyphase supply circuit 5 while the field winding 3 is short circuited through a discharge resistor 6. Therefore, normal supply circuit voltage is applied to the motor armature winding 2 to start the motor as an induction motor. In practice the motor will also have a squirrel cage winding which is not shown. While I have shown a full voltage starting arrangement, it will be understood that any other well known synchronous motor starting system may be used to start the motor from rest and accelerate it to approximately synchronous speed. Also in order to simplify the disclosure, I have illustrated a 2-pole motor, but it will be obvious to those skilled in the art that my invention is applicable to motors of any number of poles.

In accordance with my invention, I provide an improved arrangement for controlling the operation of the field switch 7 so that it is closed to effect the application of excitation to the field winding 3 at that instant when the angular displacement between the revolving armature flux and the motor field poles is such as to cause the motor to develop its maximum pull-in torque when the motor has to synchronize its maximum connected load and so that it is opened to effect the removal of excitation from the field winding 3 immediately after the motor falls out of step. In the particular embodiment of my invention, shown in Fig. 1, I accomplish this result by providing a quick acting relay 10 and a suitable unidirectional current conducting device, such as a half-wave copper oxide rectifier 11, in series relation with an electric circuit which has impressed across it a voltage proportional to one of the phase voltages of the polyphase circuit 5 and which also has connected in series therewith a suitable current controlling device having contacts which are closed during a predetermined portion of each revolution of the rotor. As shown in Fig. 1, the relay 10 and the rectifier 11 are arranged to be connected across the secondary winding of a potential transformer 12, the primary winding of which is connected across one phase of the polyphase supply circuit 5 when the switch 4 is closed. Also connected in the circuit of the relay 10 are the brushes 16 and 17 which engage a slip ring 14 driven by the motor 1 and having a conducting strip 15 along a portion of its periphery. The brushes 16 and 17 and the conducting strip 15 are so constructed that, when the two-pole motor shown in Fig. 1 is operating at the maximum desired synchronizing speed, the brushes 16 and 17 are in contact with the conducting strip 15 once during each revolution of the rotor for a time interval equal to approximately a half cycle of the voltage of the supply circuit 5. Preferably either the slip ring 14 is adjustably mounted on the motor shaft or the brushes 16 and 17 are adjustably mounted so that the conducting strip 15 may be made to bridge the brushes 16 and 17 during any desired portion of each revolution of the rotor.

Any suitable means, examples of which are well known in the art, may be provided for preventing the field switch 7 from being closed until after the motor has been started and has reached a speed from which it can be pulled into synchronism by applying direct current to the field winding 3. For accomplishing this result, I have shown a time relay 20 which is so connected that it prevents the field switch 7 from being closed, after the switch 4 has been closed, until a predetermined time has elapsed which is normally long enough to allow the motor to reach the desired synchronizing speed.

In order to effect the opening of the field switch 7, when the motor falls out of synchronism, the connections of the relay 10 and rectifier 11 are changed in response to the closing of the field switch 7 so that as long as this field switch remains closed, a second circuit is completed for the relay 10 across the secondary winding of the transformer 12 during a different predetermined portion of each revolution of the rotor. This new circuit for the relay 10 is completed by the conducting strip 15 of the slip ring 14 bridging the adjustable brushes 17' and 18 when the rotor is in a predetermined position. However, as long as the motor 1 remains in synchronism, the relay 10 is not sufficiently energized to be operated each time its circuit is completed through the brushes 17' and 18.

The operation of the arrangement shown in Fig. 1 is as follows: When it is desired to start the motor 1, the switch 4 is closed so that the voltage of the supply circuit 5 is applied directly to the armature winding 2 to start the motor from rest and accelerate it to approximately synchronous speed as an induction motor. The closing of the auxiliary contacts 21 on the switch 4 completes through the contacts 25 on the field switch 7 an energizing circuit for the time relay 20, but this relay does not open its contacts 22 and close its contacts 23 and 24 until sufficient time has elapsed after the closing of the switch 4 to allow the motor 1 to reach its maximum induction motor speed. This maximum induction motor speed depends upon the motor load and in practice is usually a speed between 95 and 99% of synchronous speed. However, since it is not so important at what angle the excitation is applied when the load connected to the motor is small, it is desirable that the field applying means be designed to effect the application of the field excitation at approximately the optimum angle between the armature flux and the field poles at the lowest maximum induction motor speed when the motor is driving its maximum connected load. When the relay 20 operates and closes its contacts 24, a circuit is completed through contacts 26 on the field switch 7 for the relay 10 each time the conducting strip 15 bridges the brushes 16 and 17. However, the relay 10 receives sufficient current to cause it to open its contacts 26 and close its contacts 27 only if the rotor remains within a predetermined portion of its path of movement during a predetermined half cycle of the supply circuit voltage. This will be seen more clearly from Fig. 2 in which the curve V represents the secondary voltage of the transformer 12 and Tv represents the time of each voltage cycle and therefore the time of one revolution of the armature flux of motor 1 and the time of one revolution of the rotor when it is rotating at synchronous speed. Tr represents the time of each revolution of the rotor when operating at a 10% slip and the straight line Tc—1 to Tc—10 represent the time intervals that the brushes 16 and 17 are bridged by the conducting strip during 10 successive revolutions of the motor when the slip thereof is 10% and the brushes 16 and 17 are so spaced that at this slip the conducting strip 15 bridges the brushes 16 and 17 once during each revolution of the motor for a time interval equal to a half cycle of the voltage of the supply circuit 5 and the curves C represent the current that flows through the relay 10 during these 10 successive revolutions. Under these assumed conditions, it is evident from Fig. 2 that at a 10% slip the brushes 16 and 17 are bridged by the conducting strip 15 to effect the energization of the relay 10 by a complete half cycle of the supply circuit current only once in each nine revolutions of the rotor and that there exists a predetermined angular relationship between the armature flux and the position of the motor field poles at the instant the relay 10 does operate to close its contacts 27. By varying the relative positions of the conducting strip 15 and the brushes 16 and 17, the relay 10 can be made to pick up at any desired angular relationship between the line voltage and the motor field poles.

From Fig. 2, it will be apparent that, under the assumed conditions, the relay 10 is not energized long enough to be picked up during any slip cycle when the motor slip is less than 10%. Also at motor slips greater than 10% the angular range between the armature flux and the motor field poles during which the relay 10 can pick up increases directly with the increase in slip, but this increase in angular range is relatively small in degrees over the normally small synchronizing range, which is usually from 1% slip to 5% slip.

By properly adjusting the brushes 16 and 17, it will be apparent from Fig. 2 that the relay 10 can be made to pick up only within a definite angular range between the armature flux and the motor field poles for each slip below a predetermined slip and that the magnitude of the angular range decreases as the slip decreases until at said predetermined slip it is a single definite point in the slip cycle. For slips below this predetermined slip, the relay 10 does not pick up.

Preferably the brushes 16 and 17 are adjusted so that throughout the synchronizing range, which as previously mentioned is usually from 95 to 99% of synchronous speed, the relay 10 can pick up during a predetermined angular range for each value of slip. Also the slip ring 14 is adjusted so that the mean angle in the angular range during which the relay 10 can pick up at the lowest synchronizing speed, which is when the motor is driving its maximum connected load, is prior to the optimum angle for applying excitation by an amount sufficient to compensate for the operating time of the field switch 7. In this manner the angular range during which the field switch 7 can close when the motor is driving its maximum connected load is limited to a small angular range on each side of the optimum angle. When the motor is synchronized from a higher synchronizing speed, it is evident that due to the constant operating time of the field switch it may be closed at a greater angular displacement from the optimum angle than under the maximum load conditions. This, however, is of no material disadvantage because it is not so essential under light load conditions to have the field applied at the optimum angle.

When the relay 10 operates to close its contacts 27, a circuit is completed for the closing coil 8 of the field switch 7 across the secondary winding of the potential transformer 12 through contacts 23 of relay 20 and contacts 29 of switch 4. The closing of the contacts 30 of field switch 7 connects the source of excitation 9 to the field winding 3 to cause the motor to pull into step and the opening of the contacts 31 of the field switch 7 effects the disconnection of the discharge resistor 6 from across the field winding 3. By closing its contacts 32, the field switch 7 completes a shunt circuit around the contacts 27 of the relay 10 so that the field switch 7 remains closed after the relay 10 opens its contacts 27. By opening its contacts 25, the field switch 7 interrupts the circuit of the timing relay 20 which, after being deenergized for a predetermined length of time, opens its contacts 23 and 24 and closes its contacts 22. Before the time relay 20 opens its contacts 23, however, the quick acting relay 10 closes its contacts 26 and completes a shunt circuit around the contacts 23 of the relay 20. Consequently, the circuit of the closing coil 8 of the field switch 7 remains completed through the contacts 32 of the field switch 7, contacts 26 of the relay 10 and contacts 29 of the switch 4. By closing its contacts 33, the field switch 7 prepares a circuit for relay 10 and rectifier 11, which is closed each time the conducting strip 15 bridges the contacts 17' and 18. As long as the motor remains in synchronism, the angular displacement between the supply circuit voltage vector and the axis of the field poles is such that sufficient current does not flow through the relay 10 each time this circuit is completed to cause the relay to operate. However, when the motor falls out of synchronism, this angular displacement changes so that sufficient current flows through the relay 10 to cause it to open its contacts 26 and thereby interrupt the holding circuit of the closing coil 8 of the field switch 7. The opening of the field switch 7 disconnects the field winding 3 from the source of excitation 9 and reestablishes the starting connections so that the motor will resynchronize in the manner heretofore described after sufficient time has elapsed for the relay 20 to pick up.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a synchronous machine having an armature winding and a field winding, an alternating current circuit, means for connecting said armature winding to said circuit, a source of direct current, a relay, unidirectional current conducting means, means dependent upon the position of the rotor of said machine for establishing an operating circuit for said relay through said unidirectional current conducting means while said rotor is moving over a predetermined portion of its path of movement, means for applying to said relay circuit a voltage which varies with the voltage of said alternating current circuit, and means responsive to the operation of said relay for establishing the connection of said source of direct current to said field winding.

2. In combination, a synchronous machine having an armature winding and a field winding, an alternating current supply circuit connected to said armature winding, a source of direct current, a relay, unidirectional current conducting means, means dependent upon the position of the rotor of said machine for establishing an operating circuit for said relay through said unidirectional current conducting means while said rotor is moving over a predetermined portion of its path of movement, means for applying to said relay circuit a voltage which varies with the voltage of said alternating current circuit, means for connecting said source of direct current to said field winding, and means responsive to the operation of said relay for effecting the disconnection of said field winding from said source.

3. In combination, a synchronous machine having an armature winding and a field winding, an alternating current supply circuit connected to said armature winding, a source of direct current, switching means for controlling the connection between said source of direct current and said field winding, a relay, unidirectional current conducting means, means dependent upon the position of the rotor of said machine and upon the position of said switching means for establishing across one phase of said supply circuit an operating circuit for said relay through said unidirectional current conducting means while said rotor is moving over a predetermined portion of its path of movement and said source of direct current is disconnected from said field winding and for establishing across one phase of said supply circuit another operating circuit for said relay through said unidirectional current conducting means while said rotor is moving over a different predetermined portion of its path of movement and said switching means is connecting said source of direct current to said field winding, means responsive to the operation of said relay due to the establishment of said first mentioned operating circuit for effecting the operation of said switching means to connect said source to said field winding, and means responsive to the operation of said relay due to the establishment of said other operating circuit for effecting the operation of said switching means to disconnect said source from said field winding.

4. In combination, a synchronous machine having an armature winding and a field winding, an alternating current circuit, means for connecting said circuit to said armature winding, a source of direct current for said field winding, a control circuit, unidirectional current conducting means connected in said control circuit, means for applying to said control circuit a voltage which varies with the voltage of said alternating current circuit, and means dependent upon the current flowing through said unidirectional current conducting means while the rotor of said machine is moving over a predetermined portion of its path of movement for connecting said source of direct current to said field winding.

5. In combination, a synchronous machine having an armature winding and a field winding, an alternating current supply circuit connected to said armature winding, a source of direct current connected to said field winding, a control circuit, unidirectional current conducting means connected in said control circuit, means for applying to said control circuit a voltage which varies with the voltage of said supply circuit, and means dependent upon the current flowing through said unidirectional current conducting means while the rotor of said machine is moving over a predetermined portion of its path of movement for disconnecting said source of direct current from said field winding.

6. In combination, an alternating current circuit, a synchronous machine connected to said circuit, a relay, means including a current controlling device driven by said machine for supplying current to said relay only during predetermined alternate half cycles of said circuit and for a time during each of said half cycles dependent upon the position of the rotor during the respective half cycle, and means responsive to the operation of said relay for controlling the connections of the field winding of said machine.

7. In combination, an alternating current circuit, a synchronous machine connected to said circuit, a relay, means including a current controlling device driven by said machine for supplying current to said relay only during predetermined alternate half cycles of said circuit and for a time during each of said half cycles dependent upon the position of the rotor during the respective half cycle, a source of excitation, and means responsive to the operation of said relay for establishing the connection of said source to the field winding of said machine.

8. In combination, an alternating current circuit, a synchronous machine connected to said circuit, a relay, means including a current controlling device driven by said machine for supplying current to said relay only during predetermined alternate half cycles of said circuit and for a time during each of said half cycles dependent upon the position of the rotor during the respective half cycle, a source of excitation connected to the field winding of said machine, and means responsive to the operation of said relay for effecting the disconnection of said field winding from said source.

ARTHUR H. LAUDER.